(No Model.)

B. T. BABBITT.
EVAPORATING APPARATUS.

No. 286,369. Patented Oct. 9, 1883.

Witnesses:
Jno. T. Haynes
Ed. L. Moran

Inventor:
B. T. Babbitt
by his Attorneys
Brown & Brown

United States Patent Office.

BENJAMIN T. BABBITT, OF NEW YORK, N. Y.

EVAPORATING APPARATUS.

SPECIFICATION forming part of Letters Patent No. 286,369, dated October 9, 1883.

Application filed January 16, 1883. (No model.)

*To all whom it may concern:*

Be it known that I, BENJAMIN T. BABBITT, a citizen of the United States, and a resident of the city and county of New York and State of New York, have invented a new and useful Evaporating Apparatus, of which the following is a specificaton.

My invention relates to an improved evaporating apparatus in which brine or other liquid or solution is evaporated by the injection of superheated steam near the surface of said liquid, and which consists of a closed chamber or vessel having introduced into it near its top a steam-pipe or series of steam-pipes with outlet-openings in them, through which the superheated steam may pass, an outlet-pipe at the top of said vessel for the escape of the steam or evaporated liquid, and a valve-like receptacle at the bottom of the vessel for the purpose of receiving the crystals resulting from evaporation and discharging them from the vessel.

Figure 1:
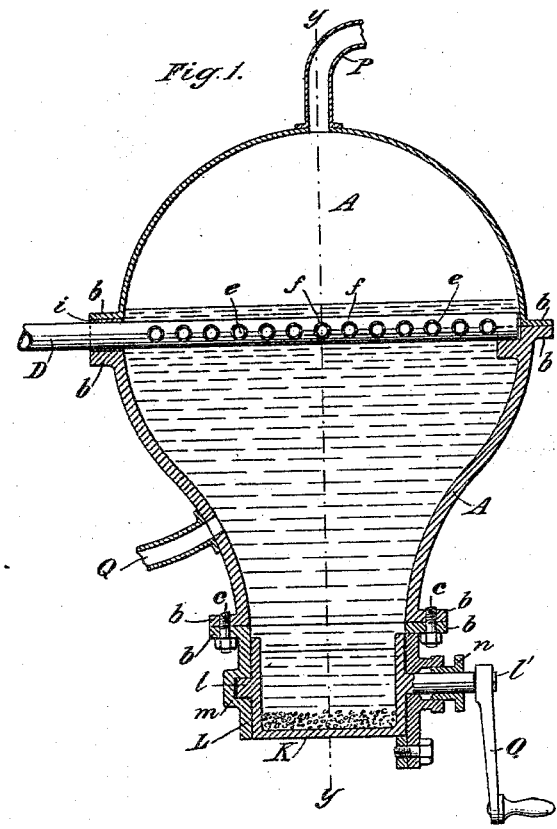
Figure 2:
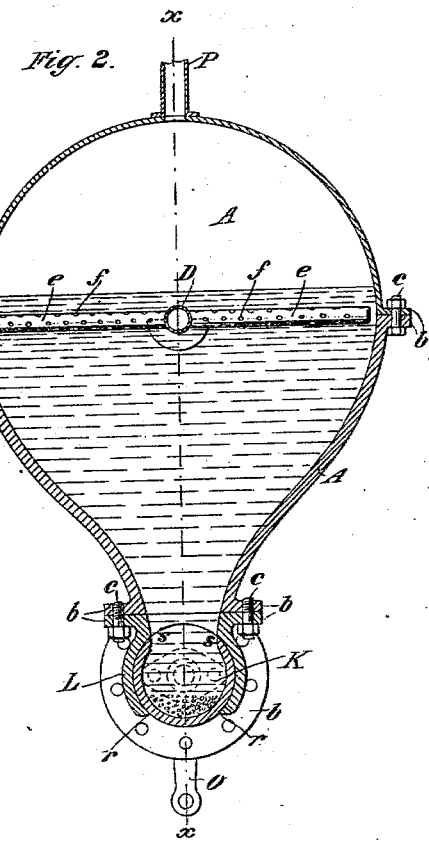
Figure 3:
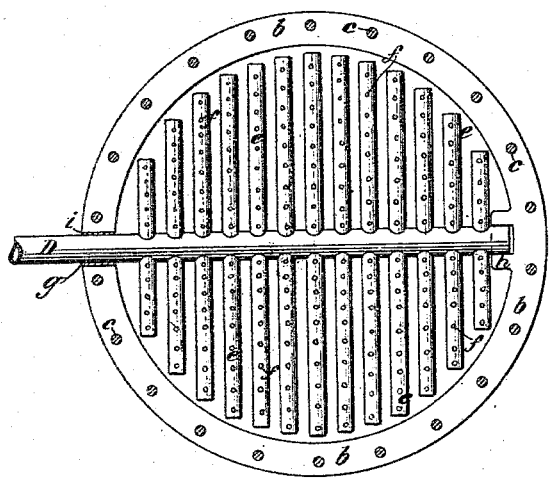
Figure 4:
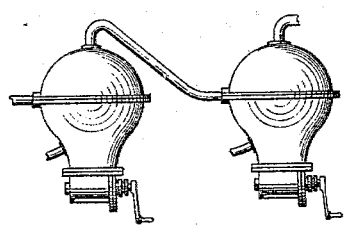

In the accompanying drawings, Figure 1 is a vertical section through the line $x\ x$ of Fig. 2. Fig. 2 is a vertical section through the line $y\ y$ of Fig. 1. Fig. 3 is a top view of the apparatus with its upper portion removed, showing the arrangement of the steam-inlet pipes. Fig. 4 is an elevation on a small scale, showing the method of connecting two or more evaporating chambers or vessels and utilizing the steam.

A is the closed evaporating-vessel, which may be made, as shown, in the form of a balloon, smaller at the bottom than at the top. This vessel may be made in several parts, having flanges $b$, which may be connected together and secured by screw-bolts $c$ passing through said flanges.

D is the main steam-inlet pipe, having smaller pipes $e$, branching out on both sides of said pipe D, and provided with small outlet-holes $f$. This pipe D and its branches is introduced through the side and near the top of the liquid-vessel A, and supported in a horizontal position in the cylindrical bearing, $g$, on one side of the casing, and an interior semi-cylindrical bearing, $h$, on the opposite side of the casing.

The bearing $g$ should be provided with a water-tight packing, $i$, to prevent the liquid from leaking out through the opening or bearing $g$.

K is a hollow cylindrical valve-like receptacle for receiving the crystals or other solid matter resulting from the evaporation. This receptacle is fitted to a cylindrical shell, L, which forms the bottom of the vessel A, and in the lower part of which is a wide port, $r$, (see Fig. 2,) which is opened and closed by the turning of the valve or receptacle K in the said shell. The said receptacle has also an opening, $s\ s$, which should correspond in size and form with the port $p\ p$ in the shell, the width of such openings being such that the valve or receptacle may turn without permitting any direct outflow through or past it from the vessel A. The said valve or receptacle has two pivots, $l\ l'$, one of which passes through a stuffing-box, $n$, in the shell L, and is furnished outside with a hand-crank, O, or other means for turning it. At the top of the vessel there is an outlet-pipe, P, for the escape of the steam or evaporated liquid.

The brine or other liquid to be evaporated is introduced into the vessel A in any appropriate manner—as, for instance, through a pipe, Q, by means of a pump or otherwise, so that the surface of said liquid is kept above the steam-inlet pipes. The superheated steam is admitted through the inlet-pipes D and $e$, which steam, escaping through the openings $f$, will circulate through the vessel A and the liquid contained therein, thus evaporating said liquid. The crystals and other solid matter which are set free by evaporation will fall into the valve or receptacle K, whence they may be discharged from time to time by simply turning this valve-receptacle upside down by means of its hand-crank O. The steam or vapor will pass out of the chamber A through the outlet-pipe P, and may escape to the atmosphere or to a condenser; or the steam outlet of one chamber may connect with the steam-inlet of another chamber, and in this way a series of said chambers may be connected together, thus utilizing the heat of the waste steam, which otherwise would be dissipated.

The advantages of having the steam-inlet pipes in the upper part of the vessel and near the surface of the liquid to be evaporated are that the liquid is more readily evaporated, and the openings or outlets in the steam-inlet pipes are not so apt to be clogged with the falling crystals and solid matter during evaporation as if said pipes were placed near the bottom or in the lower portion of the chamber or vessel.

A vacuum apparatus might be used at the end of the train or series of chambers, or the finally escaping steam might be used for heating shell-kettles.

What I claim as my invention, and desire to secure by Letters Patent, is—

The improved apparatus for evaporating brine or other liquid or solution, consisting in a closed vessel for containing said liquid or solution, perforated pipes within the upper part of said vessel for the introduction of superheated steam near the surface of the liquid or solution therein, and a valve-like receptacle in the bottom of said vessel for the collection and discharge of the crystals or solid matter resulting from evaporation, substantially as shown and described.

B. T. BABBITT.

Witnesses:
 FREDK. HAYNES,
 ED. L. MORAN.